(12) United States Patent
Park et al.

(10) Patent No.: US 12,282,098 B2
(45) Date of Patent: Apr. 22, 2025

(54) CAMERA DEVICE AND DEPTH INFORMATION EXTRACTION METHOD OF SAME

(71) Applicant: LG INNOTEK CO., LTD., Seoul (KR)

(72) Inventors: Ju Un Park, Seoul (KR); Chang Hyuck Lee, Seoul (KR); Seong Ha Jang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1063 days.

(21) Appl. No.: 17/280,781

(22) PCT Filed: Sep. 26, 2019

(86) PCT No.: PCT/KR2019/012525
§ 371 (c)(1),
(2) Date: Mar. 26, 2021

(87) PCT Pub. No.: WO2020/067738
PCT Pub. Date: Apr. 2, 2020

(65) Prior Publication Data
US 2022/0003873 A1 Jan. 6, 2022

(30) Foreign Application Priority Data
Sep. 28, 2018 (KR) .................. 10-2018-0116464

(51) Int. Cl.
*G01S 17/894* (2020.01)
*G01S 7/484* (2006.01)
(Continued)

(52) U.S. Cl.
CPC ............ *G01S 17/894* (2020.01); *G01S 7/484* (2013.01); *G01S 7/4863* (2013.01); *G01S 7/489* (2013.01);
(Continued)

(58) Field of Classification Search
CPC .... G01S 7/4863; G01S 7/4914; G01S 17/894; G01S 7/4868
See application file for complete search history.

(56) References Cited

U.S. PATENT DOCUMENTS

2013/0101176 A1 4/2013 Park et al.
2016/0164261 A1* 6/2016 Warren ................. H04N 23/11
372/50.122
(Continued)

FOREIGN PATENT DOCUMENTS

JP 2012-147132 A 8/2012
KR 10-2017-0086823 A 7/2017
(Continued)

*Primary Examiner* — Yuqing Xiao
*Assistant Examiner* — Zhengqing Qi
(74) *Attorney, Agent, or Firm* — Birch, Stewart, Kolasch & Birch, LLP

(57) ABSTRACT

A camera device according to an embodiment of the present invention a light output unit which outputs output light signals to be emitted to an object; a lens unit which includes an infrared (IR) filter and at least one lens disposed on the IR filter, and focuses input light signals reflected from the object; an image sensor which generates electrical signals from the input light signals focused by the lens unit; an image processing unit which acquires depth information about the object by using the input light signals received in the image sensor; and a control unit which controls the output light signals to be output sequentially for a plurality of light source groups included in the light output unit, and the input light signals to be received sequentially for a plurality of pixel groups included in the light input unit.

14 Claims, 12 Drawing Sheets

(51) Int. Cl.
*G01S 7/4863* (2020.01)
*G01S 7/489* (2006.01)
*G01S 7/4911* (2020.01)
*G01S 7/4912* (2020.01)
*G01S 7/4914* (2020.01)
*G02B 13/14* (2006.01)
*G02B 26/08* (2006.01)
*G06T 7/521* (2017.01)
*G06T 7/55* (2017.01)
*H04N 23/56* (2023.01)

(52) U.S. Cl.
CPC ........... *G01S 7/4911* (2013.01); *G01S 7/4914* (2013.01); *G01S 7/4918* (2013.01); *G02B 13/14* (2013.01); *G02B 26/0833* (2013.01); *G06T 7/521* (2017.01); *G06T 7/55* (2017.01); *H04N 23/56* (2023.01); *G06T 2207/10028* (2013.01)

(56) References Cited

U.S. PATENT DOCUMENTS

| | | | |
|---|---|---|---|
| 2016/0182789 A1* | 6/2016 | Wan | H04N 23/74 348/370 |
| 2016/0327635 A1* | 11/2016 | Scheim | G01S 7/4815 |
| 2017/0214901 A1 | 7/2017 | Zhao et al. | |
| 2018/0120441 A1* | 5/2018 | Elooz | G08G 1/04 |
| 2018/0284237 A1* | 10/2018 | Campbell | G01S 17/931 |
| 2019/0011556 A1* | 1/2019 | Pacala | G01S 17/08 |
| 2019/0056498 A1* | 2/2019 | Sonn | G01S 17/931 |
| 2019/0310375 A1* | 10/2019 | Finkelstein | G01S 7/4868 |

FOREIGN PATENT DOCUMENTS

| | | |
|---|---|---|
| KR | 10-2017-0088259 A | 8/2017 |
| KR | 10-1854188 B1 | 5/2018 |
| KR | 10-1877128 B1 | 8/2018 |

* cited by examiner (a)                          (b)

(a)

(b)

(a)

(b)

(c)

$a = (2Io/M\times N)\times 2$

CAMERA DEVICE AND DEPTH INFORMATION EXTRACTION METHOD OF SAME

CROSS REFERENCE TO RELATED APPLICATIONS

This application is the National Phase of PCT International Application No. PCT/KR2019/012525, filed on Sep. 26, 2019, which claims priority under 35 U.S.C. 119 (a) to Patent Application No. 10-2018-0116464, filed in the Republic of Korea on Sep. 28, 2018, all of which are hereby expressly incorporated by reference into the present application.

TECHNICAL FIELD

The present disclosure relates to a camera device and a depth information extraction method of the same.

BACKGROUND ART

The 3D contents are applied in many fields such as education, manufacturing, and autonomous driving as well as games and culture, and in order to acquire the 3D contents, depth information (or depth map) is required. The depth information is information representing a distance in space, and represents perspective information of one point to the other points in a 2D image.

As a method of acquiring the depth information, a method of projecting infrared (IR) structured light onto an object, a method of using a stereo camera, a method of Time of Flight (ToF), or the like are used. According to the TOF method, the distance to an object is calculated by measuring the flight time, i.e., the time it takes for emitted light to return by being reflected. The greatest advantage of the ToF method is that it provides distance information for 3D space in real time quickly. In addition, the user may obtain accurate distance information without applying separate algorithms or hardware correction. In addition, accurate depth information may be obtained by measuring a very close subject or a moving subject.

However, according to the ToF method, when light is outputted from a light output unit, a total average power Total $P_{avg}$ of the output light is limited to satisfy the eye safety standard. Accordingly, there is a problem that the intensity of the output light is limited, and a measurement distance decreases due to attenuation of a signal reflected from the object.

Accordingly, there is a need for a device and method capable of increasing a measurement distance while satisfying the eye safety standard.

DISCLOSURE

Technical Problem

A technical problem to be achieved by the present disclosure is to provide a camera device that extracts depth information using a ToF method and a depth information extraction method of the same.

Technical Solution

A camera device according to an embodiment of the present disclosure includes: a light output unit which outputs an output light signal to be irradiated to an object and includes a plurality of light sources arranged in a predetermined rule; a lens unit which includes an infrared (IR) filter and at least one lens disposed on the IR filter, and collects an input light signal reflected from the object; an image sensor which generates an electric signal from the input light signal collected by the lens unit; an image processing unit which acquires depth information of the object by using a phase difference or a time difference between the output light signal and the input light signal received by the image sensor; and a control unit which controls the light output unit, the lens unit, the image sensor, and the image processing unit, wherein the plurality of light sources are divided into at least two light source groups, the control unit controls the output light signal to be outputted sequentially from each of the light source groups, the image sensor includes at least two pixel groups divided for each of the light source groups, and the control unit controls the input light signal to be collected sequentially in each of the pixel groups.

The control unit may adaptively adjust the number of the at least two light source groups, and the number of the at least two light source groups may increase as a distance to the object increases.

As the number of the at least two light source groups increases, the number of a plurality of light sources included in each of the light source groups may decrease and an intensity of the output light signal outputted from each of the light source groups may increase.

An arrangement pattern of a plurality of light sources included in each of the light source groups may be the same as an arrangement pattern of a plurality of light sources included in another light source group.

A plurality of light sources included in each of the light source groups may be uniformly distributed over all of the plurality of light sources included in the light output unit.

The at least two light source groups may include a first light source group having a plurality of light sources disposed in odd columns and a second light source group having a plurality of light sources disposed in even columns.

Each of the pixel groups may include a plurality of pixels, and an intensity of the input light signal may be evenly distributed to the plurality of pixels.

The at least two pixel groups may include a first pixel group and a second pixel group which are spatially divided in a checkered shape.

The image processing unit may acquire one depth image by using at least two subframes extracted from the incident light signal collected for each of the pixel groups.

An image processing method of a camera device according to an embodiment of the present disclosure, includes: outputting, from a light output unit, an output light signal to irradiate an object; and extracting depth information of the object by using at least one of a time difference or a phase difference between the output light signal and an input light signal which has been reflected from the object and collected in an image sensor, wherein the light output unit includes a plurality of light sources arranged in a predetermined rule, and the plurality of light sources are divided into at least two light source groups, the image sensor includes at least two pixel groups divided for each of the light source groups, the output light signal is controlled to be outputted sequentially from each of the light source groups, and the input light signal is controlled to be collected sequentially in each of the pixel groups.

Advantageous Effects

By using the camera device according to an embodiment of the present disclosure, it is possible to increase the measurement distance of the depth information while satisfying the eye safety standard. In addition, by using the camera device according to an embodiment of the present disclosure, the number of light sources and the intensity of light may be adaptively adjusted depending on the measurement distance, and accordingly, it is possible to extract the depth information at a long distance as well as at a short distance without significantly increasing power consumption.

BEST MODE

Hereinafter, preferred embodiments of the present disclosure will be described in detail with reference to the accompanying drawings.

However, the technical spirit of the present disclosure is not limited to some embodiments to be described, but may be implemented in various different forms, and within the scope of the technical spirit of the present disclosure, one or more components may be selectively combined or substituted between embodiments.

In addition, terms (including technical and scientific terms) used in embodiments of the present disclosure may be interpreted as meanings that can be generally understood by those of ordinary skill in the art to which the present disclosure belongs, unless clearly defined and described, and commonly used terms such as terms defined in the dictionary may be interpreted in consideration of the meanings of the context of the related technology.

In addition, terms used in embodiments of the present disclosure are for describing the embodiments and are not intended to limit the present disclosure.

In the present disclosure, the singular form may include the plural form unless specifically stated in the phrase, and when described as "at least one (or one or more) of A, B, and C", it may include one or more of all combinations that can be combined with A, B, and C.

In addition, a term such as first, second, A, B, (a), or (b) may be used in describing a component in embodiments of the present disclosure.

This term is merely for distinguishing the component from other components, and the nature, turn, or order of the corresponding component is not limited by the term.

Further, when a component is described as being 'connected', 'coupled', or 'accessed' to another component, it may include not only a case where the component is directly connected, coupled, or accessed to the another component, but also a case where the component is connected, coupled, or accessed to the another component through still another component disposed between the component and the another component.

Furthermore, when it is described as being formed or disposed on the "top (on) or bottom (under)" of each component, it may include not only a case where two components are in direct contact with each other, but also a case where one or more other components are formed or disposed between the two components. In addition, when expressed as "up (above) or down (under)", it may include not only an upward direction but also a downward direction with respect to one component.

Figure 1:
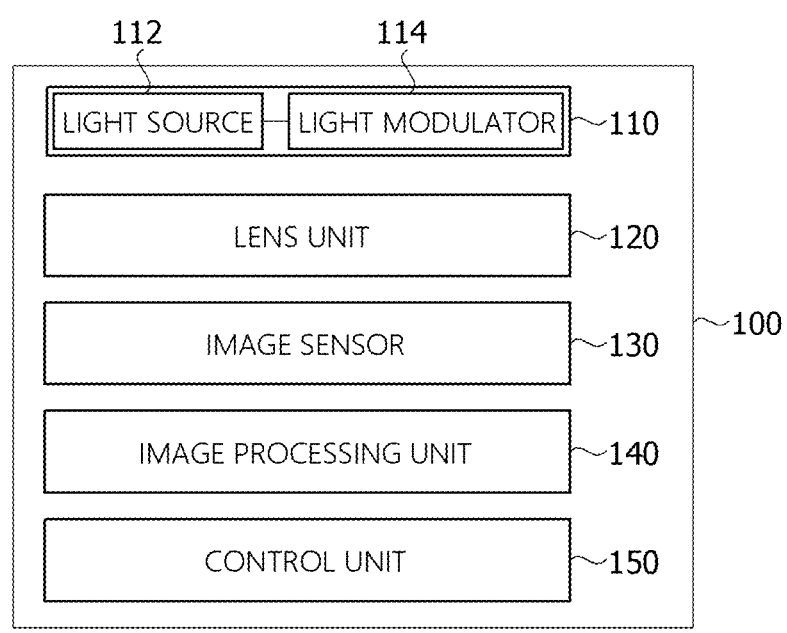
FIG. 1 is a block diagram of a camera device according to one embodiment of the present disclosure.

FIG. 1 is a block diagram of a camera device according to one embodiment of the present disclosure.

Referring to FIG. 1, a camera device 100 includes a light output unit 110, a lens unit 120, an image sensor 130, an image processing unit 140, and a control unit 150. Here, the control unit 150 controls the light output unit 110, the lens unit 120, the image sensor 130, and the image processing unit 140.

Since the camera device 100 according to an embodiment of the present disclosure extracts depth information using a ToF function, it may be used herein interchangeably with a ToF camera device or a ToF camera module.

The light output unit 110 generates an output light signal and then irradiates an object with it. In this case, the light output unit 110 may generate and output the output light signal in the form of a pulse wave or a continuous wave. The continuous wave may be in the form of a sinusoid wave or a squared wave. By generating the output light signal in the form of a pulse wave or a continuous wave, the camera device 100 may detect a time difference or a phase difference between the output light signal outputted from the light output unit 110 and an input light signal that has been reflected from the object and inputted to the camera device 100. Herein, output light may refer to light that is outputted from the light output unit 110 and incident on the object, and input light may refer to light that is outputted from the light output unit 110, reaches the object, is reflected from the object, and is then inputted to the camera device 100. From the point of view of the object, the output light may be incident light and the input light may be reflected light.

The light output unit 110 irradiates the object with the generated output light signal during a predetermined integration time. Here, the integration time means one frame period. When generating a plurality of frames, an established integration time is repeated. For example, when the camera device 100 photographs the object at 20 FPS, the integration time is ½₀ [sec]. In addition, when 100 frames are generated, the integration time may be repeated 100 times.

The light output unit 110 may generate a plurality of output light signals having different frequencies. The light output unit 110 may sequentially repeatedly generate the plurality of output light signals having different frequencies. Alternatively, the light output unit 110 may simultaneously generate the plurality of output light signals having different frequencies.

Figure 2:
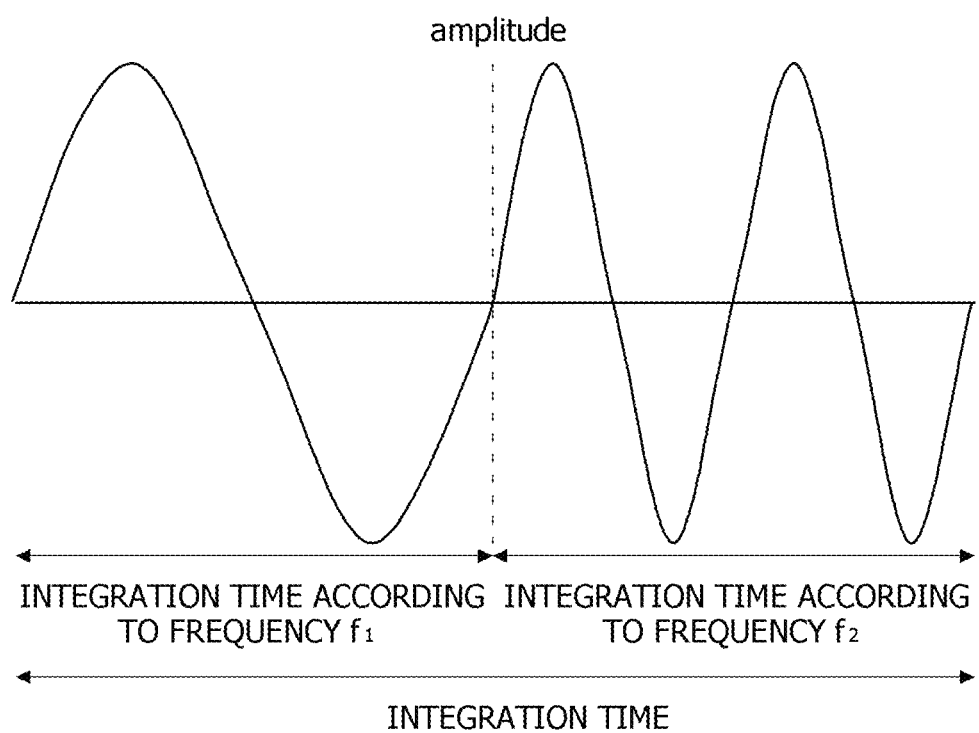
FIG. 2 is a diagram for describing a frequency of an output light signal.

FIG. 2 is a diagram for describing a frequency of an output light signal. According to an embodiment of the present disclosure, as shown in FIG. 2, the light output unit 110 may generate the output light signal having a frequency f1 during the first half of the integration time, and generate the output light signal having a frequency f2 during the other half of the integration time.

According to another embodiment, the light output unit 110 may control some of a plurality of light emitting diodes to generate the output light signal having a frequency $f_1$, and control the remaining light emitting diodes to generate the output light signal having a frequency $f_2$.

To this end, the light output unit 110 may include a light source 112 that generates light and a light modulator 114 that modulates light.

First, the light source 112 generates light. The light generated by the light source 112 may be infrared rays having a wavelength of 770 to 3000 nm, or visible light having a wavelength of 380 to 770 nm. The light source 112 may use the light emitting diode (LED), and may have a shape in which the plurality of light emitting diodes are arranged according to a predetermined pattern. Further, the light source 112 may include an organic light emitting diode (OLED) or a laser diode (LD). Alternatively, the light source 112 may be a vertical cavity surface emitting laser (VCSEL). The VCSEL is one of laser diodes that convert an electric signal into a light signal, and may use a wavelength of about 800 to 1000 nm, for example, about 850 nm or about 940 nm.

The light source 112 generates the output light signal in the form of a pulse wave or a continuous wave by repeatedly turning on/off at a predetermined time interval. The predetermined time interval may be the frequency of the output light signal.

The light modulator 114 controls the light source 112 to generate the output light signal in the form of a continuous wave or a pulse wave. The light modulator 114 may control the light source 112 to generate the output light signal in the form of a continuous wave or a pulse wave through a frequency modulation, a pulse modulation, or the like.

Meanwhile, the lens unit 120 collects the input light signal reflected from the object and transmits it to the image sensor 130.

Figure 3:
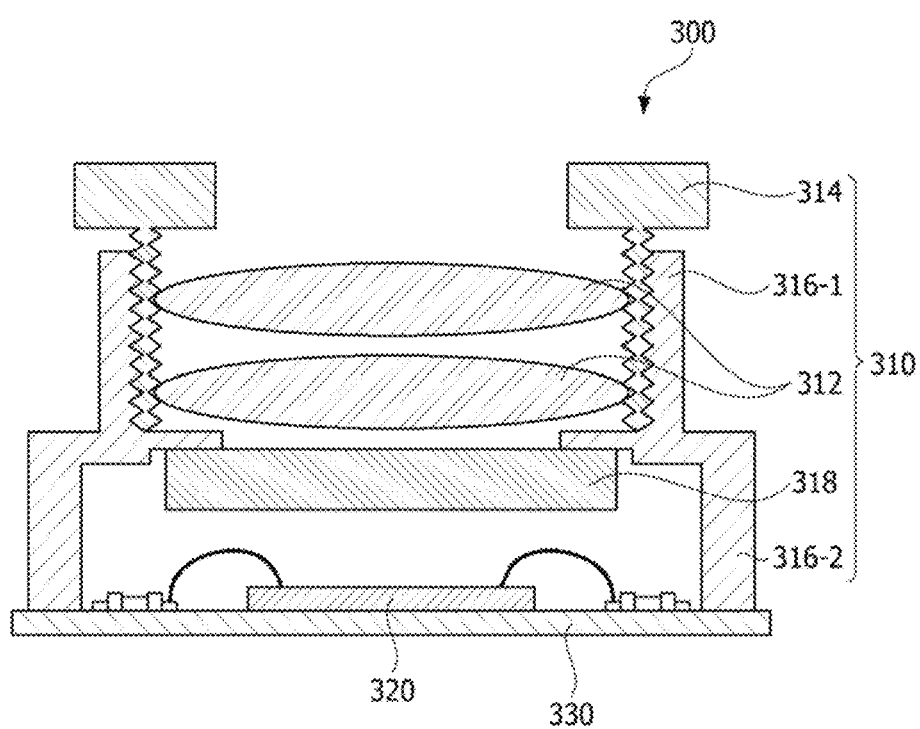
FIG. 3 is an example of a cross-sectional view of a camera device.

FIG. 3 is an example of a cross-sectional view of a camera device.

Referring to FIG. 3, the camera device 300 includes a lens assembly 310, an image sensor 320, and a printed circuit board 330. Here, the lens assembly 310 may correspond to the lens unit 120 of FIG. 1, and the image sensor 320 may correspond to the image sensor 130 of FIG. 1. In addition, the image processing unit 140 and the like of FIG. 1 may be implemented in the printed circuit board 330. Although not shown, the light output unit 110 of FIG. 1 may be disposed on the side surface of the image sensor 320 on the printed circuit board 330 or may be disposed outside the camera device 300, for example, on the side surface of the camera device 300.

The lens assembly 310 may include a lens 312, a lens barrel 314, a lens holder 316, and an IR filter 318.

A plurality of lenses 312 may be provided, or one lens 312 may be provided. When the plurality of lenses 312 are provided, all lenses may be aligned with respect to a central axis to form an optical system. Here, the central axis may be the same as an optical axis of the optical system.

The lens barrel 314 may be coupled to the lens holder 316, and a space for accommodating a lens may be provided therein. The lens barrel 314 may be rotationally coupled to one or a plurality of lenses, but this is exemplary, and may be coupled in other ways such as a method using an adhesive (e.g., an adhesive resin such as epoxy).

The lens holder 316 may be coupled to the lens barrel 314 to support the lens barrel 314, and may be coupled to the printed circuit board 330 on which the image sensor 320 is mounted. A space in which the IR filter 318 can be attached may be formed under the lens barrel 314 by the lens holder 316. The lens holder 316 may have a helical pattern formed on its inner circumferential surface, and may be rotationally coupled to the lens barrel 314 having a helical pattern in the same manner on its outer circumferential surface. However, this is exemplary, and the lens holder 316 may be coupled to and the lens barrel 314 through an adhesive, or the lens holder 316 may be formed integrally with the lens barrel 314.

The lens holder 316 may be divided into an upper holder 316-1 coupled to the lens barrel 314 and a lower holder 316-2 coupled to the printed circuit board 330 on which the image sensor 320 is mounted. The upper holder 316-1 and the lower holder 316-2 may be integrally formed, may be formed separately from each other and then fastened or coupled, or may have a structure separated from each other with a space therebetween. In this case, the diameter of the upper holder 316-1 may be smaller than the diameter of the lower holder 316-2.

The above example is merely one embodiment, and the lens unit 120 may be configured with another structure capable of collecting the input light signal incident on the camera device 100 and transmitting it to the image sensor 130.

Referring back to FIG. 1, the image sensor 130 generates an electric signal using the input light signal collected through the lens unit 120.

The image sensor 130 may be synchronized with an on/off period of the light output unit 110 to detect the input light signal. Specifically, the image sensor 130 may detect light at each of in-phase and out-phase with the output light signal outputted from the light output unit 110. That is, the image sensor 130 may repeatedly perform a step of absorbing the incident light signal while the light source is turned on and a step of absorbing the incident light signal while the light source is turned off.

Next, the image sensor 130 may use a plurality of reference signals having different phase differences to generate an electric signal corresponding to each reference signal. The frequency of the reference signal may be set equal to the frequency of the output light signal outputted from the light output unit 110. Accordingly, when the light output unit 110 generates the output light signal at a plurality of frequencies, the image sensor 130 generates an electric signal using a plurality of reference signals corresponding to each frequency. The electric signal may include information on the amount of charge or voltage corresponding to each reference signal.

Figure 4:
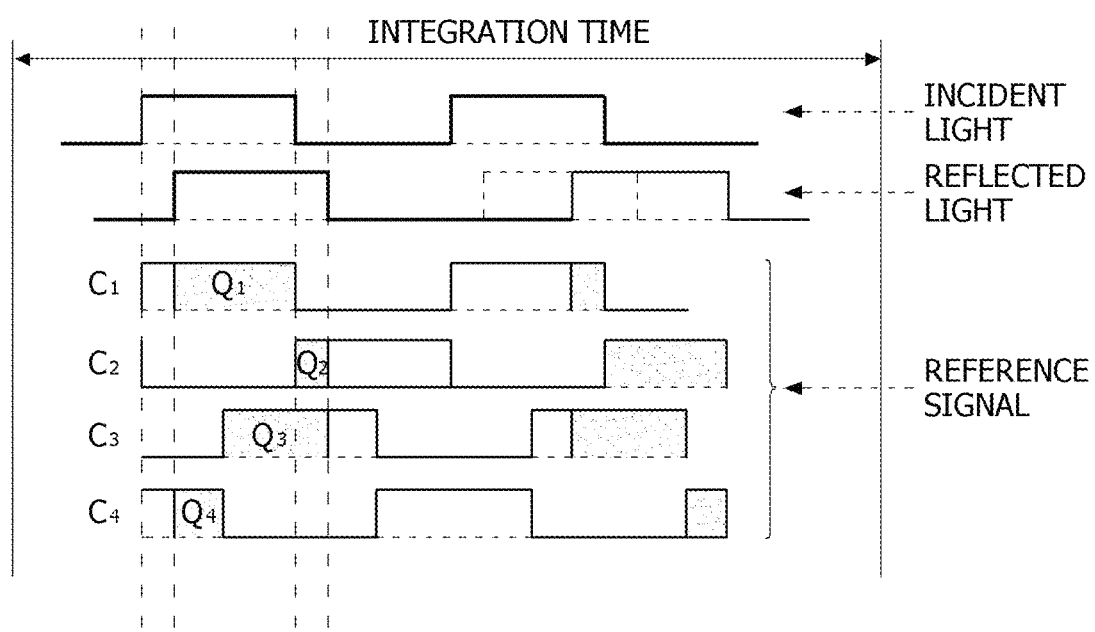
FIG. 4 is a diagram for describing a process of generating an electric signal according to an embodiment of the present disclosure.

FIG. 4 is a diagram for describing a process of generating an electric signal according to an embodiment of the present disclosure.

As shown in FIG. 4, there may be four reference signals $C_1$ to $C_4$ according to an embodiment of the present disclosure. The reference signals $C_1$ to $C_4$ may each have the same frequency as the output light signal, i.e., an incident light signal from the object's point of view, but may have a phase difference of 90 degrees from each other. One reference signal Ci of the four reference signals may have the same phase as the output light signal. The phase of the input light signal, i.e., a reflected light signal from the object's point of view, is delayed by a distance by which the output light signal is incident on the object and returned by being reflected. The image sensor 130 mixes the input light signal with each reference signal. Then, the image sensor 130 may generate an electric signal corresponding to a shaded portion of FIG. 4 for each reference signal.

In another embodiment, when the output light signal is generated at a plurality of frequencies during an integration time, the image sensor 130 absorbs the input light signal according to the plurality of frequencies. For example, it is assumed that the output light signal is generated at frequencies $f_1$ and $f_2$, and the plurality of reference signals have a phase difference of 90 degrees from each other. Then, since the incident light signal also has the frequencies $f_1$ and $f_2$, four electric signals may be generated through the input light signal having a frequency of $f_1$ and four reference signals corresponding thereto. In addition, four electric signals may be generated through the input light signal having a frequency of $f_2$ and four reference signals corresponding thereto. Thus, a total of eight electric signals may be generated.

The image sensor 130 may be configured in a structure in which a plurality of pixels are arranged in a grid form. The image sensor 130 may be a complementary metal oxide semiconductor (CMOS) image sensor or a charge coupled device (CCD) image sensor. In addition, the image sensor 130 may include a ToF sensor for receiving infrared light reflected from a subject and measuring a distance using time or phase difference.

Figure 5:
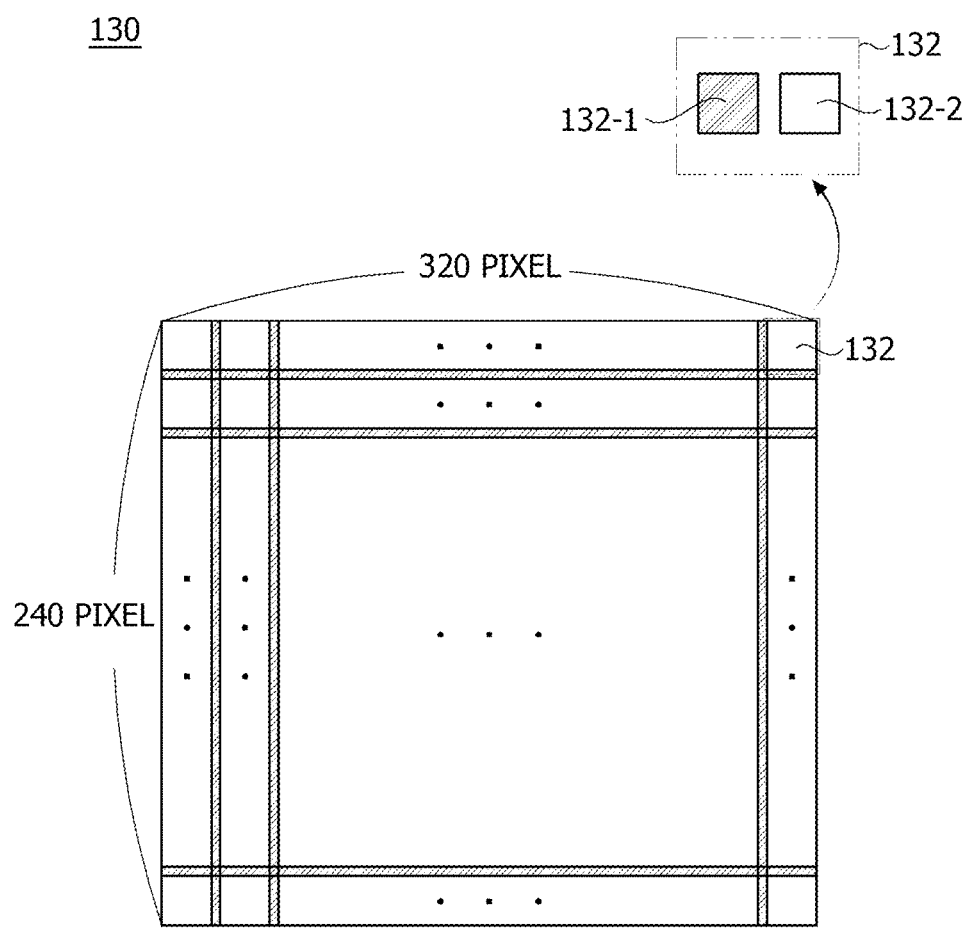
FIG. 5 is a diagram for describing an image sensor according to an embodiment of the present disclosure.

FIG. 5 is a diagram for describing an image sensor according to an embodiment of the present disclosure. For example, as shown in FIG. 5, in the case of the image sensor 130 having a resolution of 320×240, 76,800 pixels are arranged in a grid form. In this case, a constant gap may be formed between the plurality of pixels as in a shaded portion of FIG. 5. In an embodiment of the present disclosure, one pixel will be described as including the constant gap adjacent to the pixel.

According to an embodiment of the present disclosure, each pixel 132 may include a first light receiving unit 132-1 including a first photodiode and a first transistor, and a second light receiving unit 132-2 including a second photodiode and a second transistor.

The first light receiving unit 132-1 receives the input light signal at the same phase as the waveform of the output light. In other words, while the light source is turned on, the first photodiode is turned on to absorb the input light signal. In addition, while the light source is turned off, the first photodiode is turned off to stop absorbing the input light signal. The first photodiode converts the absorbed input light signal into current and transfers it to the first transistor. The first transistor converts the received current into an electric signal and outputs it.

The second light receiving unit 132-2 receives the input light signal at a phase opposite to the waveform of the output light. In other words, while the light source is turned on, the second photodiode is turned off to absorb the input light signal. In addition, while the light source is turned off, the second photodiode is turned on to stop absorbing the input light signal. The second photodiode converts the absorbed input light signal into current and transfers it to the second transistor. The second transistor converts the received current into an electric signal.

Accordingly, the first light receiving unit 132-1 may be referred to as an in-phase receiving unit, and the second light receiving unit 132-2 may be referred to as an out-phase receiving unit. As such, when the first light receiving unit 132-1 and the second light receiving unit 132-2 are activated with a time difference, the difference occurs in the amount of received light depending on the distance to the object. For example, when the object is right in front of the camera device 100 (i.e., when the distance is 0), since the time it takes for light to return by being reflected from the object after the light is outputted from the light output unit 110 is 0, the on/off period of the light source becomes a light receiving period as it is. Accordingly, only the first light receiving unit 132-1 receives the light, and the second light receiving unit 132-2 does not receive the light. As another example, if the object is located at a predetermined distance away from the camera device 100, since it takes time for light to return by being reflected from the object after the light is outputted from the light output unit 110, the on/off period of the light source is different from the light receiving period. Accordingly, the difference occurs in the amounts of light received by the first light receiving unit 132-1 and the second light receiving unit 132-2. Thus, the distance to the object may be calculated using the difference between the amounts of light inputted to the first light receiving unit 132-1 and the second light receiving unit 132-2. Referring back to FIG. 1, the image processing unit 140 calculates a phase difference between the output light and the input light using the electric signal received from the image sensor 130 and calculates the distance between the object and the camera device 100 using the phase difference.

Specifically, the image processing unit 140 may calculate the phase difference between the output light and the input light using information on the amount of charge of the electric signal.

As described above, four electric signals may be generated for each frequency of the output light signal. Accordingly, the image processing unit 140 may calculate a phase difference to between the output light signal and the input light signal by using Equation 1 below.

$$t_d = \arctan\left(\frac{Q_3 - Q_4}{Q_1 - Q_2}\right) \qquad \text{[Equation 1]}$$

Here, $Q_1$ to $Q_4$ are the amounts of charge of the four electric signals, respectively. $Q_1$ is the amount of charge of the electric signal corresponding to the reference signal of the same phase as the output light signal. $Q_2$ is the amount of charge of the electric signal corresponding to the reference signal whose phase is 180 degrees slower than the output light signal. $Q_3$ is the amount of charge of the electric signal corresponding to the reference signal whose phase is 90 degrees slower than the output light signal. $Q_4$ is the amount of charge of the electric signal corresponding to the reference signal whose phase is 270 degrees slower than the output light signal.

Then, the image processing unit 140 may calculate the distance between the object and the camera device 100 by using the phase difference between the output light signal and the input light signal. In this case, the image processing unit 140 may calculate a distance d between the object and the camera device 100 using Equation 2 below.

$$d = \frac{c}{2f} \frac{t_d}{2\pi} \quad \text{[Equation 2]}$$

Here, c is the speed of light and f is the frequency of the output light.

According to an embodiment of the present disclosure, a ToF IR image and a depth image may be obtained from the camera device 100.

Figure 6:
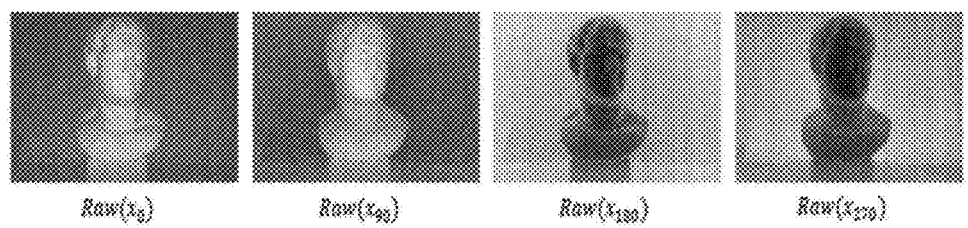
FIG. 6 is an example of a raw image for four phases obtained from a camera device according to an embodiment of the present disclosure.

More specifically in this regard, as illustrated in FIG. 6, raw images for four phases may be obtained from the camera device 100 according to an embodiment of the present disclosure. Here, the four phases may be 0°, 90°, 180°, and 270°, the raw image for each phase may be an image consisting of digitized pixel values for each phase and may be used interchangeably with a phase image, a phase IR image, or the like.

Figure 7:
FIG. 7 is an example of a ToF IR image obtained from the raw image of FIG. 6.

If calculated as in Equation 3 below using the four phase images of FIG. 6, an amplitude image, which is the ToF IR image of FIG. 7, may be obtained.

$$\text{Amplitude} = \quad \text{[Equation 3]}$$
$$\frac{1}{2}\sqrt{(\text{Raw}(x_{90}) - \text{Raw}(x_{270}))^2 + (\text{Raw}(x_{180}) - \text{Raw}(x_0))^2}$$

Here, $\text{Raw}(x_0)$ may be a data value for each pixel received by the sensor at phase 0°, $\text{Raw}(x_{90})$ may be a data value for each pixel received by the sensor at phase 90°, $\text{Raw}(x_{180})$ may be a data value for each pixel received by the sensor at phase 180°, and $\text{Raw}(x_{270})$ may be a data value for each pixel received by the sensor at phase 270°.

Alternatively, if calculated as in Equation 4 below using the four phase images of FIG. 6, an intensity image, which is another ToF IR image, may be obtained.

$$\text{Intensity} = |\text{Raw}(x_{90}) - \text{Raw}(x_{270})| + |\text{Raw}(x_{180}) - \text{Raw}(x_0)| \quad \text{[Equation 4]}$$

Here, $\text{Raw}(x_0)$ may be a data value for each pixel received by the sensor at phase 0°, $\text{Raw}(x_{90})$ may be a data value for each pixel received by the sensor at phase 90°, $\text{Raw}(x_{180})$ may be a data value for each pixel received by the sensor at phase 180°, and $\text{Raw}(x_{270})$ may be a data value for each pixel received by the sensor at phase 270°.

As such, the ToF IR image is an image generated by a process of subtracting two of the four phase images from each other, and in this process, background light may be removed. As a result, only the signal in a wavelength band outputted from the light source remains in the ToF IR image, thereby increasing the IR sensitivity to the object and reducing noise significantly.

Herein, the ToF IR image may refer to the amplitude image or the intensity image, and the intensity image may be used interchangeably with a confidence image. As shown in FIG. 7, the ToF IR image may be a gray image.

Figure 8:
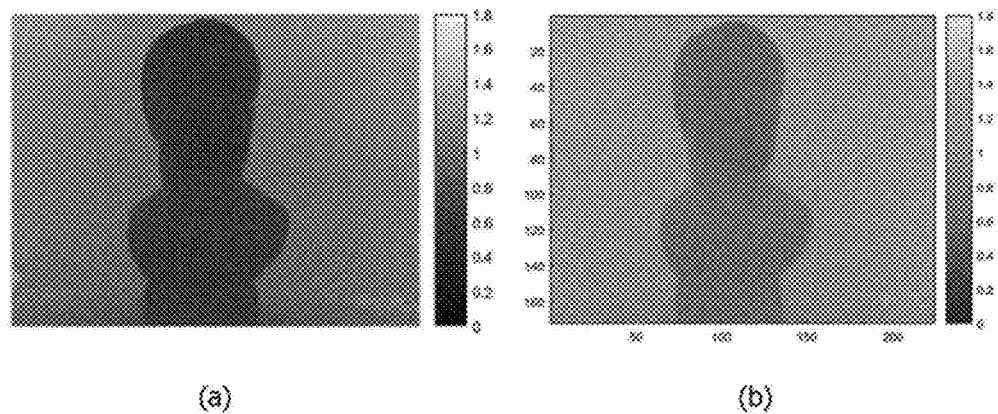
FIG. 8 is an example of a depth image obtained from the raw image of FIG. 6.

Meanwhile, if calculated as in Equations 5 and 6 below using the four phase images of FIG. 6, a depth image of FIG. 8 may also be obtained.

$$\text{Phase} = \arctan\left(\frac{\text{Raw}(x_{90}) - \text{Raw}(x_{270})}{\text{Raw}(x_{180}) - \text{Raw}(x_0)}\right) \quad \text{[Equation 5]}$$

$$\text{Depth} = \frac{1}{2f} c \frac{\text{Phase}}{2\pi} \quad (c = \text{speed of light}) \quad \text{[Equation 6]}$$

Meanwhile, according to the In-direct ToF method described in FIG. 4, as the modulation frequency is decreased, the measurement distance to the object may increase while the resolution may decrease, and as the modulation frequency is increased, the resolution may increase while the measurement distance to the object may decrease. In an embodiment of the present disclosure, using the characteristic of the In-direct ToF method in which an illuminance E is proportional to the intensity of the light and inversely proportional to the square of the distance to an object d, it is desired to increase the distance d to the object by increasing the intensity I of light while keeping the illuminance E constant.

An embodiment of the present disclosure may be applied not only to the In-direct ToF method but also to the Direct ToF method. According to the Direct ToF method, it is necessary to control the average power of the output light below a predetermined level in order to satisfy the eye safety standard.

Figure 9:
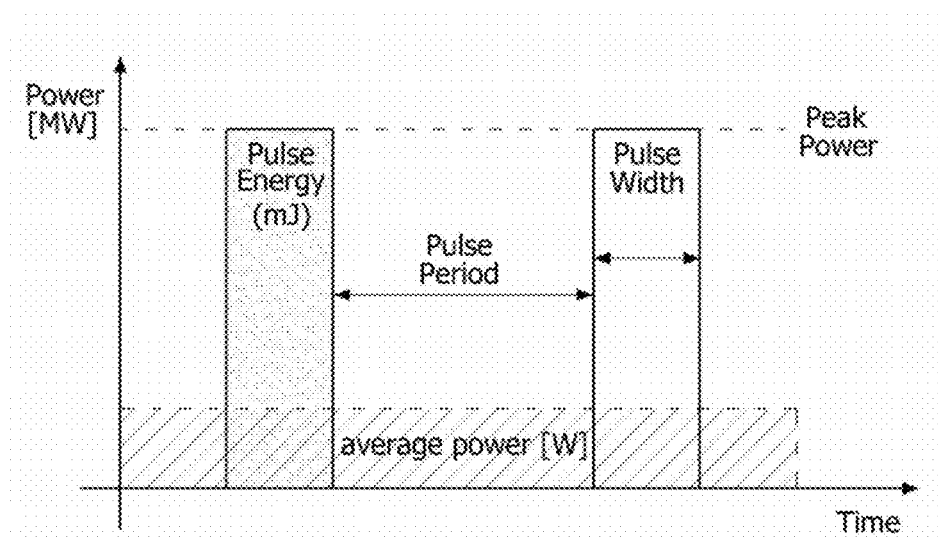
FIG. 9 is a diagram illustrating a relationship between an average power $P_{avg}$ of output light and an intensity $P_{pk}$ of output light.

FIG. 9 is a diagram illustrating a relationship between an average power $P_{avg}$ of output light and an intensity $P_{pk}$ of output light.

Referring to FIG. 9, the average power $P_{avg}$ of the output light may be expressed as in Equation 7.

$$P_{avg} = P_{pk} \times PW/P_{rt} \quad \text{[Equation 7]}$$

Here, $P_{avg}$ is an average power of the output light in a predetermined area for a predetermined time, $P_{pk}$ is an intensity, i.e., a peak power of the output light, PW is a pulse width, and $P_{rt}$ is a repetition time of a pulse.

With reference to the aforementioned content, it may be seen that when PW and $P_{rt}$ are controlled, it is possible to increase the distance d to the object by increasing the intensity $P_{pk}$ of light while maintaining the $P_{avg}$ constant.

Figure 10:
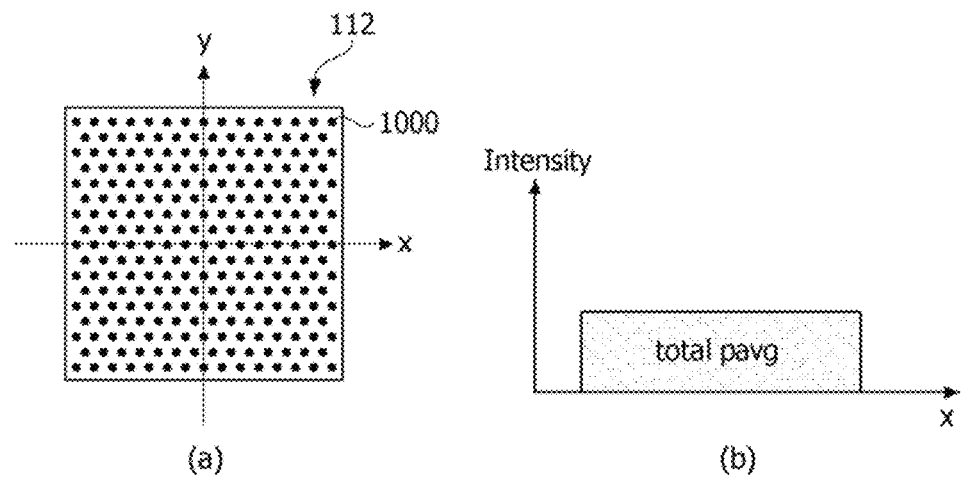
FIG. 10 shows a light source of a light output unit included in a camera device, an intensity of the light source, and a timing diagram between the light output unit and an image sensor, according to one embodiment of the present disclosure.
Figure 10:
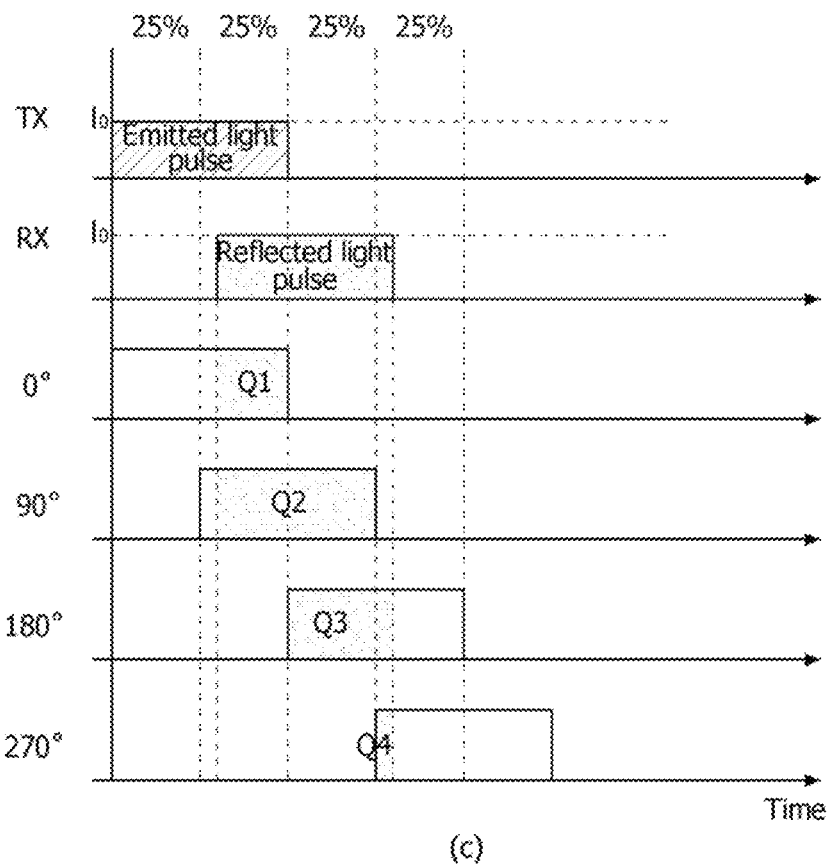

FIG. 10 shows a light source of a light output unit included in a camera device, an intensity of the light source, and a timing diagram between the light output unit and an image sensor, according to one embodiment of the present disclosure.

Referring to FIG. 10(a), the light source 112 of the light output unit 110 included in the camera device 100 according to one embodiment of the present disclosure includes a plurality of light sources 1000 arranged in a predetermined rule. Here, the plurality of light sources 1000 may have an array shape arranged in a plurality of rows and a plurality of columns. Here, it is exemplified that a plurality of light sources disposed in even rows and a plurality of light sources disposed in odd rows are alternately disposed, and a plurality of light sources disposed in even columns and a plurality of light sources disposed in odd columns are alternately disposed, but the present disclosure is not limited thereto. The plurality of light sources 1000 may be uniformly arranged as a whole according to the predetermined rule.

Here, when all of the plurality of light sources 1000 output the output light signal, as shown in FIG. 10(b), in order to satisfy the total average power Total $P_{avg}$ based on the eye safety standard, the output light signal of intensity $I_0$ may be outputted, and a timing diagram as shown in FIG. 10(c) may be obtained.

Meanwhile, according to an embodiment of the present disclosure, the plurality of light sources are spatially divided to sequentially output the output light signal. Accordingly, the total average power Total $P_{avg}$ is maintained according to a predetermined eye safety standard, but the measurement distance may be increased by increasing the intensity of each light source.

Figure 11:
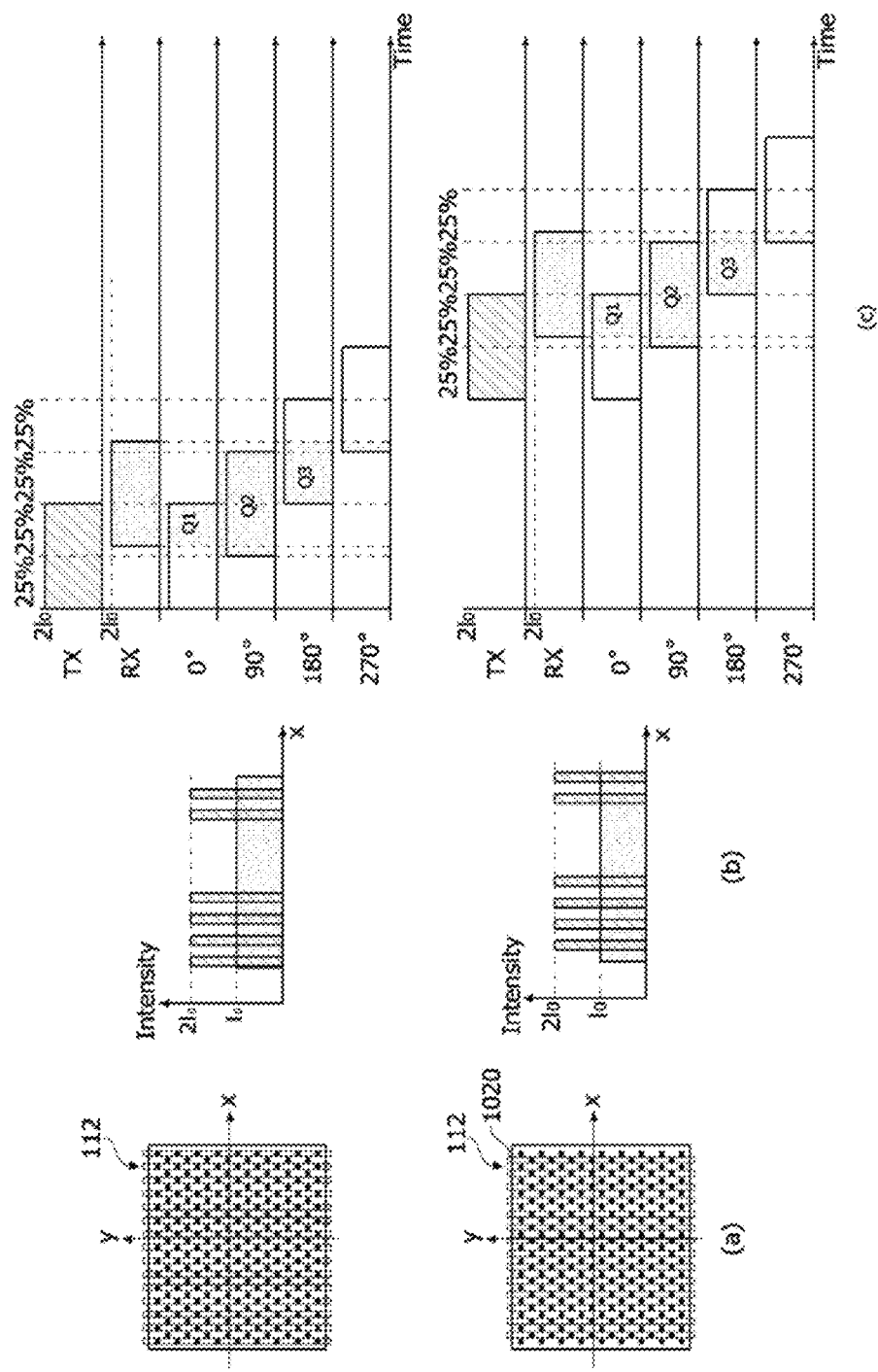
FIG. 11 is a diagram illustrating a control method of a light output unit of a camera device according to one embodiment of the present disclosure.
Figure 12:
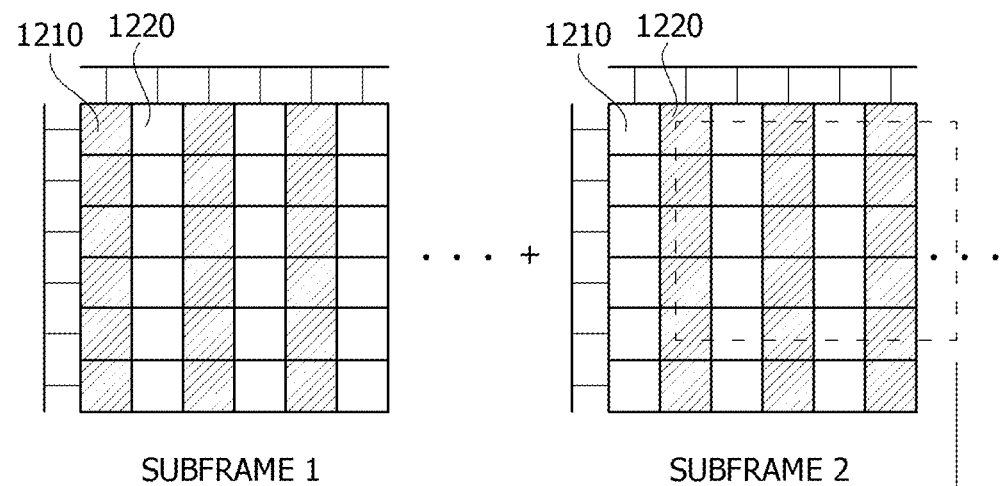
FIG. 12 is a diagram illustrating a control method of an image sensor of a camera device according to one embodiment of the present disclosure.
Figure 12:
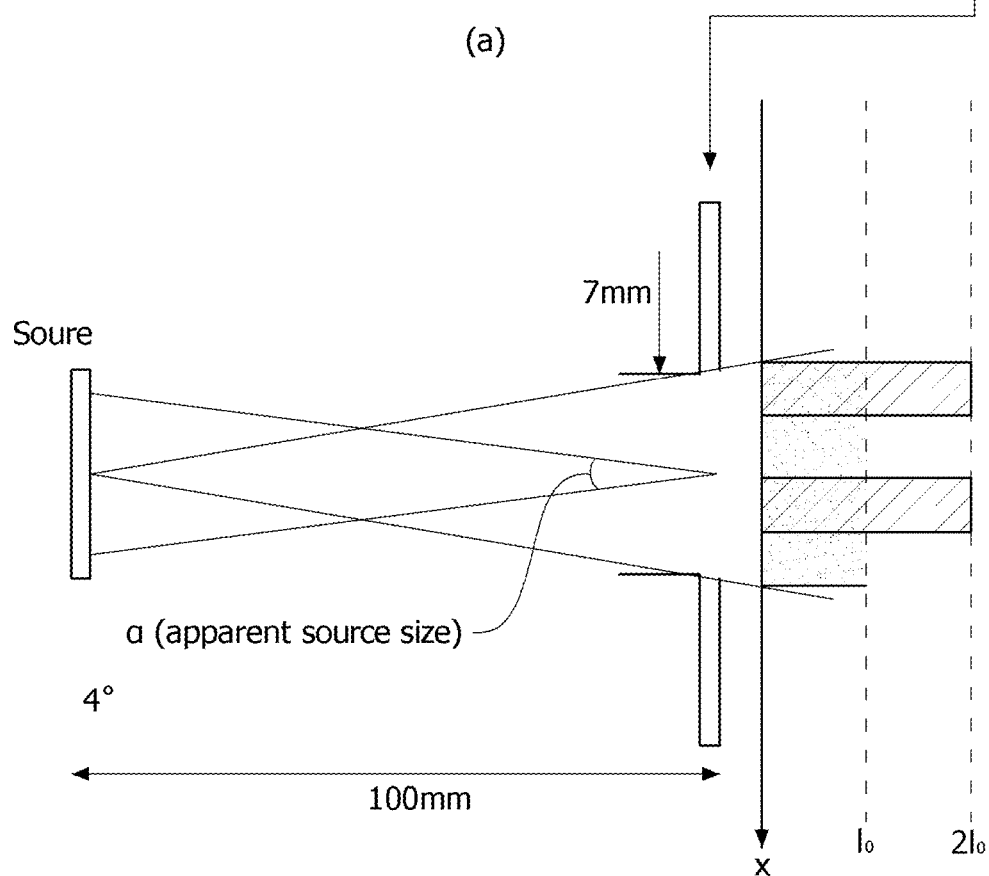

FIG. 11 is a diagram illustrating a control method of a light output unit of a camera device according to one embodiment of the present disclosure, and FIG. 12 is a diagram illustrating a control method of an image sensor of a camera device according to one embodiment of the present disclosure.

Referring to FIG. 11(a), the light output unit 110 includes the plurality of light sources 1000, and the plurality of light sources 1000 are divided into at least two light source groups. Hereinafter, for simplicity of description, a first light source group and a second light source group, which are two light source groups, are exemplified, but the present disclosure is not limited thereto.

According to an embodiment of the present disclosure, the arrangement pattern of a plurality of light sources included in a first light source group 1010 may be the same as the arrangement pattern of a plurality of light sources included in a second light source group 1020. The plurality of light sources included in each light source group may be uniformly distributed over the entire plurality of light sources 1000 included in the light output unit 110. For example, the plurality of light sources included in the first light source group 1010 may include a plurality of light sources disposed in odd columns, and the plurality of light sources included in the second light source group 1020 may include a plurality of light sources disposed in even columns. Alternatively, the plurality of light sources included in the first light source group 1010 may include a plurality of light sources disposed in odd rows, and the plurality of light sources included in the second light source group 1020 may include a plurality of light sources disposed in even rows.

Accordingly, even if the plurality of light source groups which are spatially divided sequentially output the output light signals, the output light signals may, with even distribution, reach the object and be then received by the image sensor 130, so that it is possible to obtain high-quality depth information.

In this case, the control unit 150 may control the first light source group 1010 and the second light source group 1020 to sequentially output the output light signals. The control unit 150 may further control the intensity of the output light signals of the first light source group 1010 and the second light source group 1020. Specifically, referring to FIG. 11(b), the control unit 150 may control the first light source group 1010 to output the output light signal having an intensity $PI_0$ (where P is greater than 1), and the second light source group 1020 to output the output light signal having an intensity $PI_0$ (where P is greater than 1). Accordingly, since the instantaneous intensity of the output light signals may be increased, it is possible to increase the measurement distance while satisfying the total average power Total $P_{avg}$ based on the eye safety standard, and further, the timing diagram of FIG. 11(c) may be obtained.

In one embodiment, in order for the control unit 150 to control the first light source group 1010 and the second light source group 1020 to sequentially output the output light signals, the control unit 150 may sequentially turn on or off the first light source group 1010 and the second light source group 1020. For example, when the plurality of light sources included in the first light source group 1010 is turned on, the control unit 150 may control the plurality of light sources included in the second light source group 1020 to be turned off, and when the plurality of light sources included in the first light source group 1010 is turned off, the control unit 150 may control the plurality of light sources included in the second light source group 1020 to be turned on.

In another embodiment, in order for the control unit 150 to control the first light source group 1010 and the second light source group 1020 to sequentially output the output light signals, the camera device 100 may further include a tilting element for tilting the light source and a diffraction element. The control unit 150 may control the tilting element and the diffraction element to tilt the plurality of light sources and then control the diffraction element such that, when the output light signal is outputted from the plurality of light sources included in the first light source group 1010, the output light signal is not outputted from the plurality of light sources included in the second light source group 1020; and when the output light signal is not outputted from the plurality of light sources included in the first light source group 1010, the output light signal is outputted from the plurality of light sources included in the second light source group 1020. In this case, the tilting element may include micro electro mechanical systems (MEMS). In addition, the diffraction element may include a diffraction grating or a liquid lens.

Referring to FIGS. 12(a) and 12(b), the image sensor 130 includes at least two pixel groups 1210 and 1220 divided for each light source group. For example, when the light source groups include the first light source group 1010 including the plurality of light sources disposed in odd columns and the second light source group 1020 including the plurality of light sources disposed in even columns, the first pixel group 1210 and the second pixel group 1220 may be arranged to be spatially divided in a checkered shape. Here, a pixel is a region arbitrarily defined to describe a method according to an embodiment of the present disclosure, and may mean a picture element as the smallest unit, which can be addressed, in a screen, but is not limited thereto, and a region including a plurality of picture elements may be defined as one pixel.

As described in FIGS. 11(a) and 11(b), when the first light source group 1010 and the second light source group 1020 sequentially output the output light signals of intensity $2I_0$, as shown in FIG. 12(b), the input light signals of intensity $2I_0$ may also be spatially divided and sequentially inputted to the image sensor 130. Even if the input light signals having an intensity of about $2I_0$ are inputted to the image sensor 130, since they are inputted only to a partial space, i.e., some pixel groups, of the image sensor 130, it is possible to adjust the total average power based on the eye safety standard.

Accordingly, as shown in FIG. 12(a), the control unit 150 may control the input light signals to be collected sequentially in each pixel group. In other words, the control unit 150 may control the first pixel group 1210 and the second pixel group 1220 to sequentially collect the input light signals, corresponding to a period in which the first light source group and the second light source group sequentially output the output light signals. As one example, in a case where the camera device 100 is based on the Direct ToF method, the image processing unit 140 may extract a first subframe from the incident light signals collected from the first pixel group 1210 and extract a second subframe from the incident light signals collected from the second pixel group 1220, and acquire one depth image using the first and second subframes. As another example, in a case where the camera device 100 is based on the In-Direct ToF method, the image processing unit 140 may extract four subframes for each of phase 0°, phase 90°, phase 180°, and phase 270° from the incident light signals collected from the first pixel group 1210, extract four subframes for each of phase 0°, phase 90°, phase 180°, and phase 270° from the incident light signals collected from the second pixel group 1220, and acquire one depth image using the eight subframes.

In this way, when the image processing unit 140 acquires one depth image using a plurality of subframes, a signal-to-noise ratio (SNR) may be reduced due to an increase in the number of scanning, and thus the quality of the depth image may be improved.

In one embodiment, in order for the control unit 150 to control the input light signals to be collected sequentially in each pixel group, the control unit 150 may sequentially turn on or off the first pixel group 1210 and the second pixel group 1220, corresponding to a period in which the first light source group 1010 and the second light source group 1020 sequentially output the output light signals. For example, when the readout operation of a plurality of pixels included in the first pixel group 1210 is turned on, the control unit 150 may control the readout operation of a plurality of pixels included in the second pixel group 1220 to be turned off, and when the readout operation of a plurality of pixels included in the first pixel group 1210 is turned off, the control unit 150 may control the readout operation of a plurality of pixels included in the second pixel group 1220 to be turned on. Accordingly, low power driving of the image sensor 130 is possible.

Here, the light output unit 110 and the image sensor 130 are described as each having a duty ratio of 50%, but are not limited thereto, and the duty ratio of the light output unit 110 and the image sensor 130 may be in the range of 25% to 75%.

Meanwhile, according to an embodiment of the present disclosure, the control unit may adaptively control the light source groups according to the distance to the object.

Figure 13:
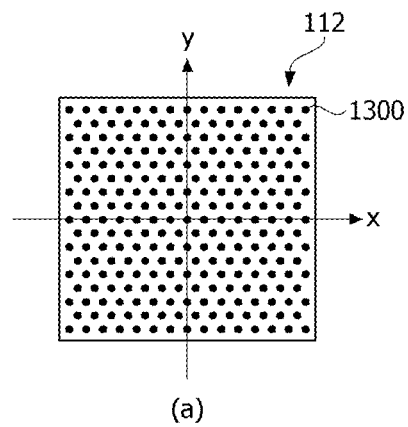
FIG. 13 is a diagram illustrating a method of adaptively controlling a light source group according to a distance to an object in one embodiment of the present disclosure.
Figure 13:
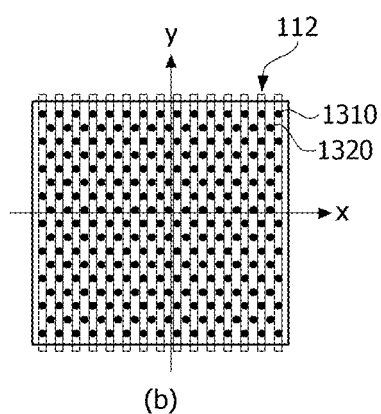
Figure 13:
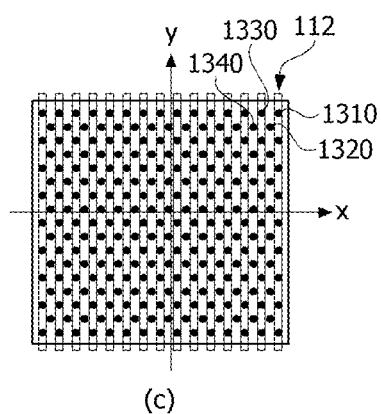

FIG. 13 is a diagram illustrating a method of adaptively controlling a light source group depending on a distance to an object in one embodiment of the present disclosure.

Referring to FIG. 13(a), the light source 112 of the light output unit 110 included in the camera device 100 according to one embodiment of the present disclosure includes a plurality of light sources 1300 arranged in a predetermined rule. Here, the plurality of light sources 1300 may have an array shape arranged in a plurality of rows and a plurality of columns. Here, it is exemplified that a plurality of light sources disposed in even rows and a plurality of light sources disposed in odd rows are alternately disposed, and a plurality of light sources disposed in even columns and a plurality of light sources disposed in odd columns are alternately disposed, but the present disclosure is not limited thereto. The plurality of light sources 1300 may be uniformly arranged as a whole according to the predetermined rule.

Here, it is assumed that when all of the plurality of light sources 1300 output the output light signal, in order to satisfy the total average power Total $P_{avg}$ based on the eye safety standard, the output light signal of intensity $I_0$ may be outputted, and accordingly, the measurement distance is d.

In one embodiment, the control unit 150 may adaptively adjust the number of light source groups depending on the distance to the object. Specifically, the control unit 150 may control the number of light source groups to increase as the distance to the object increases. When the number of light source groups increases, the number of a plurality of light sources included in each light source group decreases and the intensity of the output light signal outputted from each light source group may increase. Accordingly, while satisfying the total average power Total $P_{avg}$ based on the eye safety standard, the measurement distance of the camera device 100 may be increased.

For example, when it is desired to increase the measurement distance of the camera device 100 to d1 which is greater than d, as shown in FIG. 13(b), the control unit 150 may divide the plurality of light sources 1300 into a first light source group 1310 including a plurality of light sources arranged in odd columns and a second light source group 1320 including a plurality of light sources arranged in even columns, and may control the first light source group 1310 and the second light source group 1320 to sequentially output the output light signals. In this case, the output light signal outputted from each light source group may have, for example, an intensity $2I_0$ which is greater than an intensity $I_0$.

When it is desired to increase the measurement distance of the camera device 100 to d2 which is greater than d1, as shown in FIG. 13(c), the control unit 150 may divide the plurality of light sources 1300 into four light source groups greater than the two light source groups, and may control the four light source groups to sequentially output the output light signals. In this case, the output light signal outputted from each light source group may have, for example, an intensity 410 greater than the intensity $2I_0$.

To this end, the control unit 150 may adaptively adjust the number of light source groups using feedback information on the measurement distance. For example, the control unit 150 may receive information about the distance to the object from the image processing unit 140 or a sensor in the camera device 100, and may, if the distance to the object is more than a predetermined criterion, increase the number of light source groups and if the distance to the object is less than the predetermined criterion, decrease the number of light source groups.

In this case, the arrangement pattern of a plurality of light sources included in each light source group may be the same as the arrangement pattern of a plurality of light sources included in another light source group, and the plurality of light sources included in each light source group may be uniformly distributed over the entire plurality of light sources included in the light output unit 110.

Meanwhile, according to an embodiment of the present disclosure, the control unit may adaptively control the pixel group.

Figure 14:
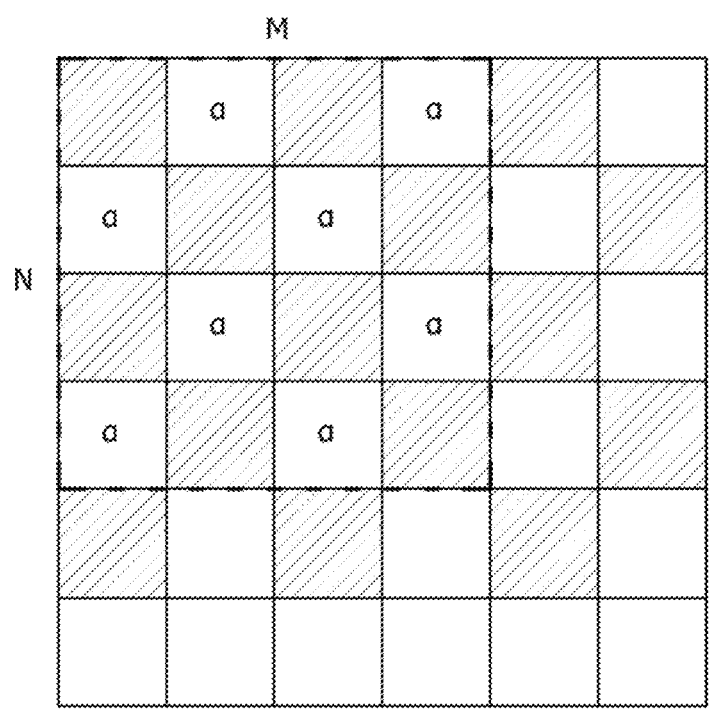
FIG. 14 is a diagram illustrating a method of adaptively controlling a pixel group in one embodiment of the present disclosure.

FIG. 14 is a diagram illustrating a method of adaptively controlling a pixel group in one embodiment of the present disclosure.

Referring to FIG. 14, it is assumed that the image sensor 130 satisfies a predetermined restricted area M*N in order to satisfy the total average power Total $P_{avg}$ based on the eye safety standard. That is, the total average power Total $P_{avg}$ needs to be incident in the predetermined restricted area M*N of the image sensor 130.

As illustrated in FIG. 13(a), when all of the plurality of light sources 1300 output the output light signals of the intensity $I_0$, the input light signal may be inputted to each pixel with an intensity of $I_0/(M*N)$.

On the other hand, as illustrated in FIG. 13(b), when the plurality of light sources 1300 are divided into the first light source group 1310 and the second light source group 1320, and sequentially output the output light signals of the intensity $2I_0$, the predetermined restricted area M*N of the image sensor 130 may be divided into a first pixel group 1410 and a second pixel group 1420, and the control unit 150 may control the input light signal having an intensity of about $2I_0$ to be evenly distributed to a plurality of pixels included in each pixel group. For example, the input light signal of $(2I_0/(M*N))*2$ may be inputted to each pixel.

Accordingly, the input light signal may be evenly distributed over the entire area of the image sensor 130 and a high quality depth image may be acquired.

Although the above description has been given focusing on the embodiments, these are merely examples and do not limit the present disclosure, and it should be understood by those of ordinary skill in the field to which the present disclosure pertains that various modifications and applications not illustrated above are possible without departing from the essential characteristics of the present embodiments. For example, each component specifically shown in the embodiments may be modified and implemented. In addition, differences related to these modifications and applications should be construed as being included in the scope of the present disclosure defined in the appended claims.

[description of numbers]

| | |
|---|---|
| 100: camera device | 110: light output unit |
| 120: lens unit | 130: image sensor |
| 140: image processing unit | 150: control unit |

The invention claimed is:

1. A camera device comprising:
   a light output unit configured to output an output light signal to be irradiated to an object;
   a lens unit including an infrared (IR) filter and at least one lens disposed on the IR filter, and configured to collect an input light signal reflected from the object;
   an image sensor configured to generate an electric signal from the input light signal collected by the lens unit;
   an image processing unit configured to acquire depth information of the object by using a phase difference or a time difference between the output light signal and the input light signal received by the image sensor, and
   a control unit,
   wherein the light output unit includes a plurality of light source groups,
   each of the plurality of light source groups includes a plurality of light sources,
   the control unit controls the output light signal to be outputted sequentially from each of the plurality of light source groups,
   the image sensor includes a plurality of pixel groups divided for each of the plurality of light source groups,
   the control unit controls the input light signal to be received sequentially in each of the plurality of pixel groups,
   the control unit adaptively adjusts the number of the plurality of light source groups,
   the number of the plurality of light source groups increases as a distance to the object increases, and
   as the number of the plurality of light source groups increases, the number of the plurality of light sources included in each of the plurality of light source groups decreases and an intensity of the output light signal outputted from each of the plurality of light source groups increases.

2. The camera device according to claim 1, wherein the plurality of light source groups includes a first light source group and a second light source group, and an arrangement pattern of the plurality of light sources included in the first light source group is the same as an arrangement pattern of the plurality of light sources included in the second light source group.

3. The camera device according to claim 1, wherein the plurality of light sources included in each of the plurality of light source groups are uniformly distributed across an entire area of the light output unit.

4. The camera device according to claim 1, wherein the plurality of light source groups include a first light source group having the plurality of light sources disposed in odd columns and a second light source group having the plurality of light sources disposed in even columns.

5. The camera device according to claim 1, wherein each of the plurality of pixel groups includes a plurality of pixels, and
   an intensity of the input light signal is evenly distributed to the plurality of pixels.

6. The camera device according to claim 1, wherein the plurality of pixel groups include a first pixel group and a second pixel group which are spatially divided in a checkered shape.

7. The camera device according to claim 1, wherein the image processing unit acquires one depth image by using at least two subframes extracted from the incident light signal collected for each of the plurality of pixel groups.

8. An image processing method of a camera device, comprising:
   outputting, from a light output unit, an output light signal to irradiate an object;
   collecting, from an image sensor, an input light signal which has been reflected from the object; and
   extracting, from an image processing unit, depth information of the object by using at least one of a time difference or a phase difference between the output light signal and the input light signal,
   wherein the light output unit includes a plurality of light source groups,
   wherein each of the plurality of light source groups includes a plurality of light source,
   wherein the image sensor includes a plurality of pixel groups divided for each of the light source groups,
   wherein the output light signal is controlled to be outputted sequentially from each of the plurality of light source groups, and
   wherein the input light signal is controlled to be received sequentially in each of the plurality of pixel groups,
   wherein the number of the plurality of light source groups is adaptively adjusted,
   wherein the number of the plurality of light source groups increases as a distance to the object increases,
   wherein as the number of the plurality of light source groups increases, the number of the plurality of light sources included in each of the plurality of light source groups decreases and an intensity of the output light signal outputted from each of the plurality of light source groups increases.

9. The camera device according to claim 1, wherein the control unit further controls an intensity of the output light signal of the plurality of light source groups.

10. The camera device according to claim 1, wherein the control unit sequentially turn on or off the plurality of light source groups.

11. The camera device according to claim 1, wherein the control unit controls the plurality of pixel groups to sequentially receive the input light signals, corresponding to a period in which the plurality of light source groups sequentially output the output light signals.

12. The camera device according to claim 1, wherein the control unit adaptively adjusts the number of the plurality of light source groups using feedback information on a measurement distance.

13. The camera device according to claim 1, wherein the light output unit outputs the output light signal by a pulse wave or a continuous wave.

14. The camera device according to claim 1, wherein the light output unit comprises a vertical cavity surface emitting laser (VCSEL).

* * * * *